(12) United States Patent
Lavrentovich et al.

(10) Patent No.: US 9,052,562 B2
(45) Date of Patent: Jun. 9, 2015

(54) METHOD FOR ELECTROPHORESIS IN LIQUID CRYSTALS

(75) Inventors: Oleg D. Lavrentovich, Kent, OH (US); Israel Esteban Lazo-Martinez, Kent, OH (US); Oleg P. Pishnyak, Akron, OH (US)

(73) Assignee: Kent State University, Kent, OH (US)

( * ) Notice: Subject to any disclaimer, the term of this patent is extended or adjusted under 35 U.S.C. 154(b) by 265 days.

(21) Appl. No.: 13/324,271

(22) Filed: Dec. 13, 2011

(65) Prior Publication Data

US 2012/0162548 A1 Jun. 28, 2012

Related U.S. Application Data

(60) Provisional application No. 61/460,034, filed on Dec. 22, 2010.

(51) Int. Cl.
*G02F 1/1333* (2006.01)
*G02F 1/167* (2006.01)
*G02F 1/13* (2006.01)

(52) U.S. Cl.
CPC .. *G02F 1/167* (2013.01); *G02F 1/13* (2013.01)

(58) Field of Classification Search
None
See application file for complete search history.

(56) References Cited

U.S. PATENT DOCUMENTS 6,515,649 B1 * 2/2003 Albert et al. .................. 345/107
7,362,406 B2 * 4/2008 Sikharulidze ................ 349/166

OTHER PUBLICATIONS

Todd M. Squires and Martin Z. Bazant, "Induced-charge electro-osmosis", J. Fluid Mech. (2004), vol. 509, pp. 217-252, Cambridge University Press.
Sumit Gangwal, Olivier J. Cayre, Martin Z. Bazant, and Orlin D. Velev, "Induced-Charge Electrophoresis of Metallodielectric Particles", Physical Review Letters PRL 100, 058302 (2008), week ending Feb. 8, 2008, pp. 058302-1 through 058302-4, The American Physical Society.
Oleg D. Lavrentovich, Israel Lazo, and Oleg P. Pishnyak, "Nonlinear electrophoresis of dielectric and metal spheres in a nematic liquid crystal", Nature, vol. 467, pp. 947-950, Oct. 21, 2010, Macmillan Publishers Limited.

* cited by examiner

*Primary Examiner* — Richard Kim
(74) *Attorney, Agent, or Firm* — Renner, Kenner, Greive, Bobak, Taylor & Weber

(57) ABSTRACT

A method of electrophoretic movement of particles through a liquid crystal utilizes a direct (DC) or alternating (AC) electric field that is applied along the liquid crystal director (for liquid crystals with a positive dielectric anisotropy) or perpendicular to the director (for liquid crystals with a negative dielectric anisotropy). A perpendicular or tilted orientation of the liquid crystal molecules at the surface of the particle causes distortions, such that the fore-aft (or left-right) symmetry of the particle is broken. The asymmetric orientation of the liquid crystal around the particle allows both charged and neutral particles to be transported, even when the particles themselves are perfectly symmetric (spherical).

51 Claims, 11 Drawing Sheets

METHOD FOR ELECTROPHORESIS IN LIQUID CRYSTALS

CROSS-REFERENCE TO RELATED APPLICATION

This application claims the benefit of U.S. Provisional Application No. 61/460,034 filed Dec. 22, 2010, the content of which is incorporated herein by reference.

GOVERNMENT LICENSING RIGHTS

This invention was made with government support under contracts No. 0504516 and No. 0906751 awarded by The National Science Foundation Division of Materials Research. The government has certain rights in the invention.

TECHNICAL FIELD

The present invention relates to liquid crystals. In particular, the present invention relates to the use of liquid crystals as a medium for electrophoresis. More particularly, the present invention relates to the use of DC and AC electric fields to achieve electrophoretic movement of particles in a liquid crystal.

BACKGROUND ART

Electrophoresis is the motion of charged dispersed particles relative to a fluid in a uniform electric field, and is typically used to separate macromolecules (e.g. DNA and proteins), to assemble colloidal structures, to transport particles in nano-fluidic and micro-fluidic devices and displays. For example, electrophoresis is utilized to transport particles in micro-fluidic displays, such as that used by the KINDLE™ electronic reader, and other electrophoretic or e-ink displays. Typically, the fluid, such as water, utilized as the electrophoretic medium is isotropic, whereby the electrophoretic velocity of a dispersed particle in the fluid is directly proportional to the applied electric field. Because of this linear dependence, only a direct current (DC) electric field can be used to drive the particles through the fluid. However, the use of an alternating current (AC) electric field to drive the particles through the fluid is more desirable, as it prevents electrolysis, i.e., electrochemical reactions near the electrodes resulting in degradation of the medium. Furthermore, the use of AC electric fields to drive the particles allows one to create steady flows of particles, as the AC field avoids accumulation of the electric charges near the electrodes screening the electric field. Furthermore, the direction of electrophoretic motion of the particles in an isotropic fluid, such as water, is typically parallel or antiparallel to the applied electric field, which makes it difficult to design three-dimensional trajectories of the particles. To move the particle in a direction that is not collinear with the direction of electric field, one needs to design the shape or to modify the surface properties of particles.

Therefore, there is a need for a method of moving particles by electric field in which the driving force can be an AC field and in which the trajectory of the particle can follow a predetermined 3D pathway. In addition, there is a need for a method of moving particles by electrophoresis in a liquid crystal using direct current (DC) or alternating current (AC) electric fields. Moreover, there is a need for a method of moving particles through a nematic liquid crystal (LC), whereby the electrophoretic velocity is proportional to the square of the applied voltage, allowing the particles to be moved by an AC electric field. In addition, there is a need for a method of moving particles by electrophoresis through a liquid crystal upon application of an AC electric field, such that the liquid crystal orientation around the particle is distorted, so as to break the fore-aft or right-left symmetry of the liquid crystal surrounding the particle. Furthermore, there is a need for a method of moving particles by electrophoresis through a liquid crystal, such that the direction of electrophoretic motion of the particle is controlled by three factors: the direction of the electric field, the shape of the particle in conjunction with the local orientation of the liquid crystal around the particle, and an orientationally ordered nematic liquid crystal far from the particle, so as to allow three-dimensional control of trajectories of moving particles to be constructed.

SUMMARY OF THE INVENTION

In light of the foregoing, it is a first aspect of the present invention to provide a method for electrophoresis in a liquid crystal.

It is another aspect of the present invention to provide a method of electrophoretic movement of a particle comprising providing a nematic liquid crystal between a pair of plates, said nematic liquid crystal having a director field in which the orientation of said director field proximate to said plates has a first alignment orientation; disposing a particle having a surface in said nematic liquid crystal, such that the orientation of said director field proximate to said surface has a second alignment orientation different from said first alignment orientation to thereby form distortions in said director field around at least part of said surface of said particle; subjecting said liquid crystal to an electric field, such that said distortions around said particle cause the velocity of mobile ions in said liquid crystal moving between said plates to be asymmetric; and moving said particle through said nematic liquid crystal.

Yet another aspect of the present invention to provide a method of electrophoretic movement of a particle comprising providing a pair of plates; disposing a polyimide layer on one of said plates; buffing said polyimide layer in a predetermined direction; disposing a nematic liquid crystal between said plates, said nematic liquid crystal having a director field, such that the orientation of said director field proximate to said polyimide layer has a first alignment orientation that is in substantial alignment with said predetermined direction; disposing a particle having a surface in said nematic liquid crystal, such that the orientation of said director field proximate to said surface has a second alignment orientation that is different from said first alignment orientation to thereby form distortions in said director field around at least part of said surface of said particle; subjecting said liquid crystal to an electric field, such that said distortions around said particle cause the velocity of mobile ions in said liquid crystal moving between said plates to be asymmetric; and moving said particle through said nematic liquid crystal along said predetermined direction.

It is another aspect of the present invention is to provide a liquid crystal cell comprising a pair of plates adapted to be coupled to a power source; a liquid crystal material disposed between said plates, said liquid crystal material having a director field in which the orientation of said director field proximate to said plates has a first alignment orientation; and a particle disposed within said liquid crystal material, said particle having a surface and configured such that orientation of said director field proximate to said surface has a second alignment orientation different from said first alignment orientation to thereby form distortions in said director field around at least part of said surface of said particle, wherein when power is applied to said plates by said power source, said distortions cause the velocity of mobile ions in said liquid crystal material moving between said plates is asymmetric, causing said particle to move.

BRIEF DESCRIPTION OF DRAWINGS

These and other features and advantages of the present invention will become better understood with regard to the following description, appended claims, and accompanying drawings wherein:

DETAILED DESCRIPTION

Figure 1A:
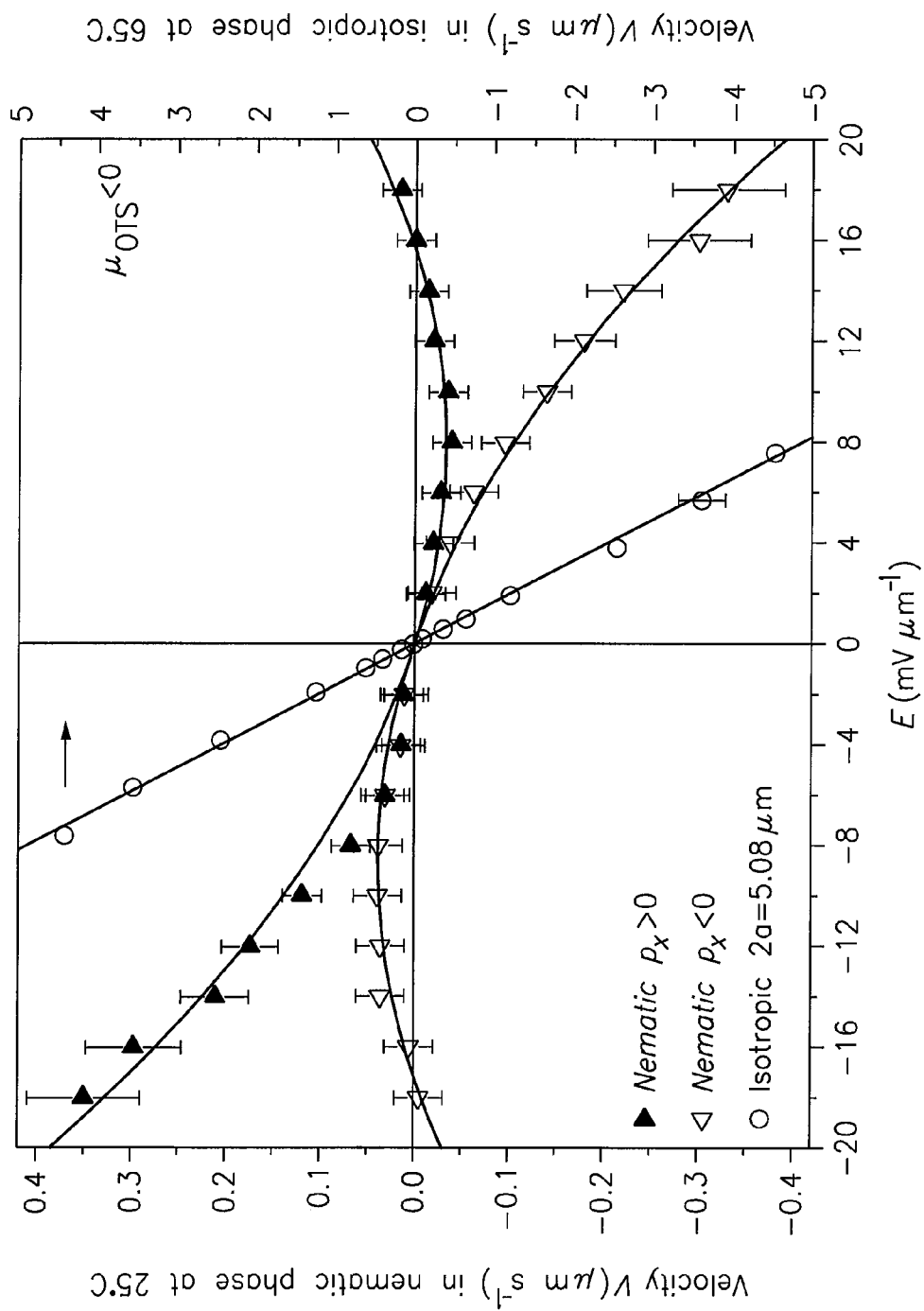
FIG. 1A is a graph showing electrophoretic velocity vs. applied field for octadecyltrichlorosilane (OTS) coated silica spheres of diameter 2a=5.08 μm in the isotropic phase (65° C.) and in the nematic phase (25° C.) of E7 liquid crystal for two polarities of the elastic dipole in accordance with the concepts of the present invention.

Before presenting the particular features of the present invention, the following discussion presents an overview of the physical properties associated with general electrophoretic motion to assist the reader in understanding the invention presented below.

With regard to electrophoretic motion, the electric charge of a particle dispersed in a fluid is screened by a diffuse cloud of mobile counterions, which have a charge that is opposite in sign to that of the particles. When an electric field is applied, the counterions and the particle move in opposite directions to one another. For a small particle, the effects of inertia can be neglected, and its electrophoretic velocity v is determined by the electrostatic "pulling" force that is proportional to the applied electric field E and by the viscous drag force imparted by the surrounding fluid. The balance results in the linear velocity-field dependence given by Smoluchowski's formula:

$$v=\mu E, \quad (1)$$

where $\mu = \in_m \zeta/\eta$ is the electrophoretic mobility of the particle, and is a material constant that is independent of E, and is proportional to the so-called "zeta-potential" $\zeta$, which characterizes the charge of the particle and its spatial distribution. The electrophoretic particle mobility $\mu$ is also defined by the dielectric permittivity of the medium $\in_m$, while being inversely proportional to the viscosity η of the medium. According to Eq. (1), an AC electric field with a zero time average produces no net electrophoretic propulsion, as a change in electric field polarity changes the sign of v, such that the period-averaged displacement of the particle is zero. This is why numerous applications of electrophoresis, including electrophoretic translocation and separation of macromolecules, such as DNA and proteins; controlled assembly of colloidal particles, microfluidics; and electrophoretic displays, also known as e-ink displays, rely on a DC electric field to drive the particles. However, the use of DC fields lead to undesirable electrochemical reactions, and as such, there is a strong interest in the electrophoretic mechanisms where the relationship between v and E is non-linear. Most studies consider isotropic fluids to be an electrophoretic medium where nonlinear behavior can be observed either for high voltages, or for particles with special properties, such as a patterned surface. In one aspect, the non-linear correction is cubic in the applied field such that the velocity of the particle is $v=\mu E+\mu_3 E^3$, where $\mu_3$ is a non-linear mobility found in nematic liquid crystals, the details of which will be discussed below.

With regard to the present invention, electrophoretic motion is contemplated utilizing an orientationally-ordered fluid, such as a nematic liquid crystal (LC) in which the dependence $v(E)$ has a component quadratic in E. The dependence $v \sim E^2$ allows one to move particles even by a symmetric, sinusoidal AC field with a zero time average and modest amplitude, as the field polarity does not influence v. The contemplated non-linear electrophoretic motion is caused by asymmetric distortions of the liquid crystal orientation around the particle. The electrophoretic velocities linear and quadratic in E have generally different directions, which brings about a high degree of freedom in moving the particle in space. We demonstrate electrophoretic motion parallel (anti-parallel) to E, perpendicular to E, as well as motion along curvilinear tracks set by spatially varying orientation of the liquid crystal.

To demonstrate the electrophoretic motion discussed above, a room-temperature nematic E7 (EM Industries) liquid crystal sample that melts into an isotropic phase at $t_{NI}=58°$ C. was used. The samples represent a liquid crystal layer of thickness $h=(50-80)$ μm disposed between two glass plates. The plates are coated with polyimide PI2555 (Microsystems), which is mechanically buffed to align the liquid crystal along the x-axis in the plane of cell. Molecular orientation in the liquid crystal is described by the director $\hat{n}$; since the medium is non-polar, $\hat{n}=-\hat{n}$. Unidirectional buffing implies that far away from the colloid, $\hat{n}=(1,0,0)=\text{const}$. In addition, the field $E=(E,0,0)$ is parallel to the x-axis, to avoid torque on the director away from the particles. The dielectric anisotropy of the E7 liquid crystal $\Delta\epsilon=\epsilon_\parallel-\epsilon_\perp=13.8$ is positive ($\epsilon_\parallel$ and $\epsilon_\perp$ are the dielectric permittivities for E parallel and perpendicular to $\hat{n}$, respectively), so that E aligns $\hat{n}$ parallel to itself. Two aluminum strips separated by a gap $L=5-12$ mm served as the electrodes.

Dielectric spheres of diameter $2a=(5-50)$μM made of silica (Bangs Laboratories), borosilicate and soda lime glass (Duke Scientific), as well as gold spheres with a diameter of $2a=(5.5-9)$μm (Alfa Aesar) were also added to the E7 liquid crystal in small quantities (<1 wt %) to avoid aggregation. All particles produce perpendicular orientation of $\hat{n}$ at their surfaces, with gold particles producing this alignment once their surface has been etched with an acid. Finally, the dielectric spheres were functionalized with surfactants, octadecyl-trichlorosilane $CH_3(CH_2)_{17}SiCl_3$ (OTS, Sigma-Aldrich), and N,N-didecyl-N-methyl-(3-trimethoxysilylpropyl)ammonium chloride [$(CH_3O)_3Si(CH_2)_3N(CH_3)(CH_2)_{18}(CH_3)_2$]Cl (DDMAC, Sigma-Aldrich).

Uniform DC Field

Since liquid crystals always contain some amount of ionic impurities ($10^{15}/cm^3$), the voltage profile across the cell is time-dependent. To screen the field, the ions move and build electric double layers near the electrodes, within a characteristic time $\tau_e=\lambda_D L/2D\approx(1-5)$ μm, where $\lambda_D=(0.1-1)$μm is the Debye screening length and $D=10^{-10}-10^{-11}$ m$^2$/s is the diffusion coefficient. The measurement v is performed within a few minutes after voltage has been applied, in the regime of stationary motion, whereupon the voltage polarity is reversed and v is measured again. The aforementioned process was repeated three times.

Isotropic phase: In the isotropic phase, the dielectric spheres show a linear electrophoresis, with $v/E=\mu=\text{const}$, as shown in FIG. 1A. The OTS-coated spheres move in the direction opposite to the electric field, with a mobility $\mu_{OTS}^I=0.6\pm0.05$ μm$^2$/mV·s (for diameter of $2a=5.08$ μM which implies a negative zeta potential. The DDMAC-coated particles move in the same direction as E, with $\mu_{DDMAC}^I=0.3\pm0.08$ μm$^2$/mV·s (for $2a=9.6$ μm). The gold spheres do not move, $\mu_{Au}^I=0$.

Nematic phase: With a perpendicular $\hat{n}$, each particle generates a radial director configuration in the surrounding liquid crystal, a so-called radial hedgehog of a topological charge 1. The uniform overall alignment of the cell implies that the total topological charge of the system is zero. The conservation law of topological charges requires that the +1 charge of the sphere is compensated by a −1 charge of additional director distortions. These are known to be of either one of two types: a point defect, the so-called hyperbolic hedgehog, as shown in FIG. 1D, or an equatorial disclination ring. The hedgehog configuration leads to the nonlinear electrophoresis, while the second configuration of quadrupolar symmetry displays only a regular linear effect.

The pair comprised of a sphere and an accompanying hedgehog forms an elastic dipole $p=(p_x,0,0)$, as shown in FIG. 1D. This dipole is elastically repelled from the bounding plates of the cell, so that the dispersed particles levitate in the bulk of the cell, thus resisting sedimentation, which hinders electrophoresis in isotropic fluids. If there is no field, the levitating spheres experience Brownian motion with zero net displacement.

Figure 1B:
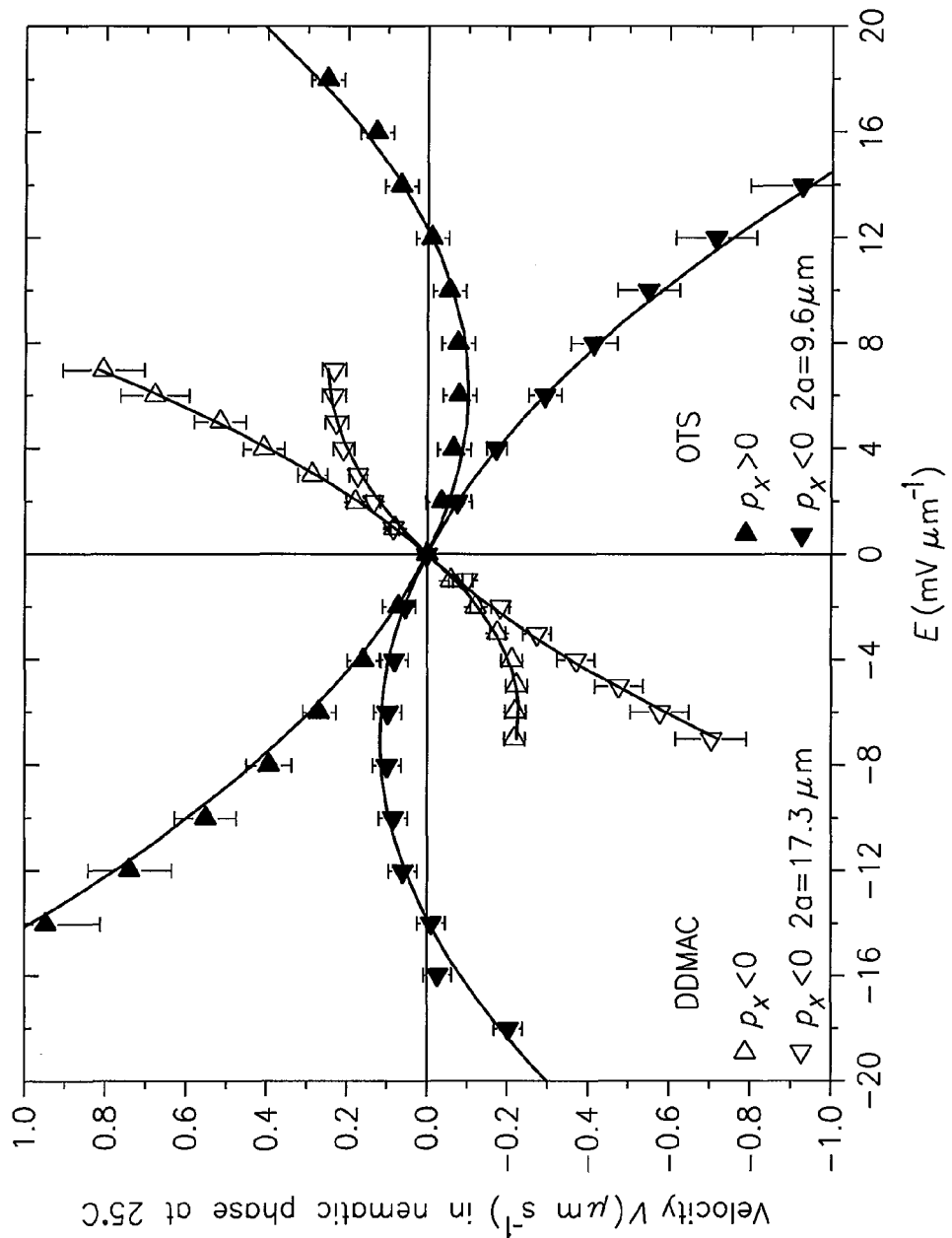
FIG. 1B is a graph showing electrophoretic velocity vs. applied field for negatively charged OTS-coated borosilicate spheres of diameter 2a=9.6 μm and positively charged didecyldimethylammonium chloride (DDMAC)-coated borosilicate spheres with a diameter of 2a=17.3 μm in the nematic phase in accordance with the concepts of the present invention.
Figure 1C:
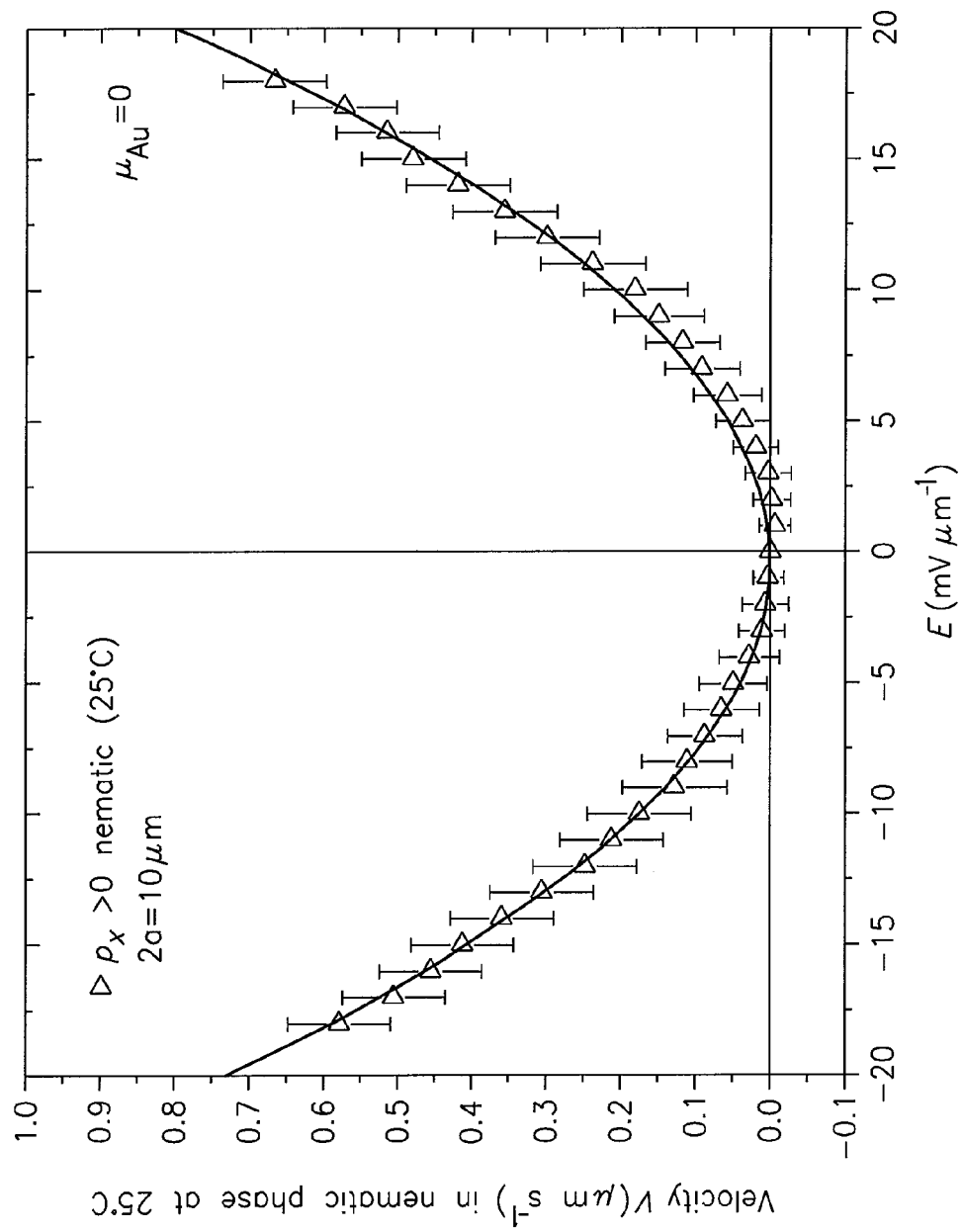
FIG. 1C is a graph showing electrophoretic velocity vs. applied field for neutral gold spheres in the nematic phase in accordance with the concepts of the present invention.
Figure 1D:
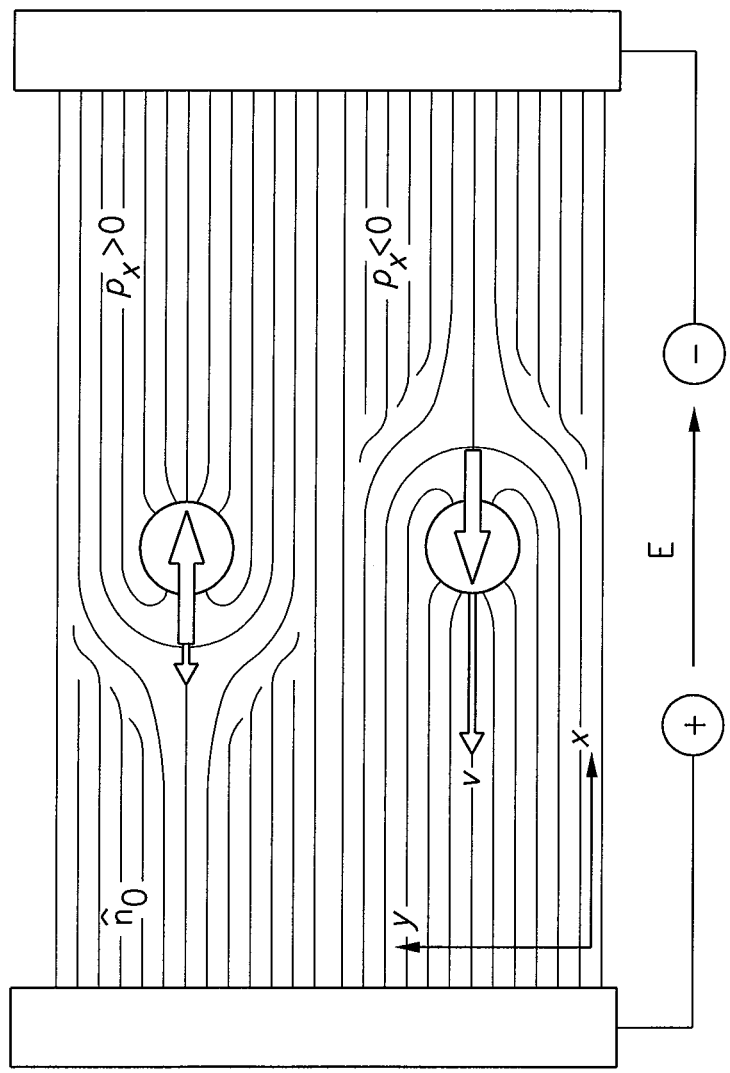
FIG. 1D is a schematic representation of an experiment with E parallel to the overall director $\hat{n}_0$ (represented with solid lines) whereby the hyperbolic hedgehog is either on the left-hand side of the sphere (upper particle, $p_x>0$) or the right (bottom particle, $p_x<0$) in accordance with the concepts of the present invention.

Once the field is applied, the particles dispersed in the liquid crystal are set into motion, with a pronounced nonlinear dependence $v(E)$, as shown in FIGS. 1A-C. In the case of charged dielectric spheres, v changes its sign not only when the field polarity is reversed but also when $|E|$ increases, as shown in FIGS. 1A-B. For metallic spheres, v does not change its direction when the polarity of E is reversed, such that the gold sphere always leads the way ahead of the hedgehog, as shown in FIG. 1C. The experimental data in FIG. 1 is well described, if in addition to the linear term in Eq. (1), one uses also a term quadratic in E:

$$v=\mu E+\beta E^2. \quad (2)$$

For neutral gold particles $\mu_{Au}=0$, the dependence $v(E)$ is parabolic with the tip at the center of coordinates and $\beta_{Au}^N=2\times10^{-3}$ μm$^3$/mV$^2$·s. For dielectric particles, the linear term does not vanish (the parabolae's tips are shifted in FIGS. 1A,B) and fitting yields $\mu_{OTS}^N=-0.01$ μm$^2$/mV·s, $\beta_{OTS}^N=0.53\times10^{-3}$ μm$^3$/mV$^2$·s for particle diameter of $2a=5.08$ μm; $\mu_{OTS}^N=-0.03$ μm$^2$/mV$^2$·s, $\beta_{OTS}=2.55\times10^{-3}$ μm$^3$/mV$^2$·s for particle diameter of $2a=9.6$ μm, and $\mu_{DDMAC}^N=0.07$ μm$^2$/mV$^2$·s, $\beta_{OTS}^N=5.5\times10^{-3}$ μm$^3$/mV$^2$·s for particle diameter of $2a=17.3$ μm. The $\mu^N$ coefficients are somewhat lower than their counterparts $\mu^I$ in the isotropic phase, which is expected, as the viscosity of the E7 liquid crystal decreases exponentially with temperature, by about a factor of 10 between 65° C. and 25° C. It should be appreciated that the β coefficients that are zero in the isotropic phase become non-zero in the nematic liquid crystal phase.

Uniform AC Field

Figure 2A:
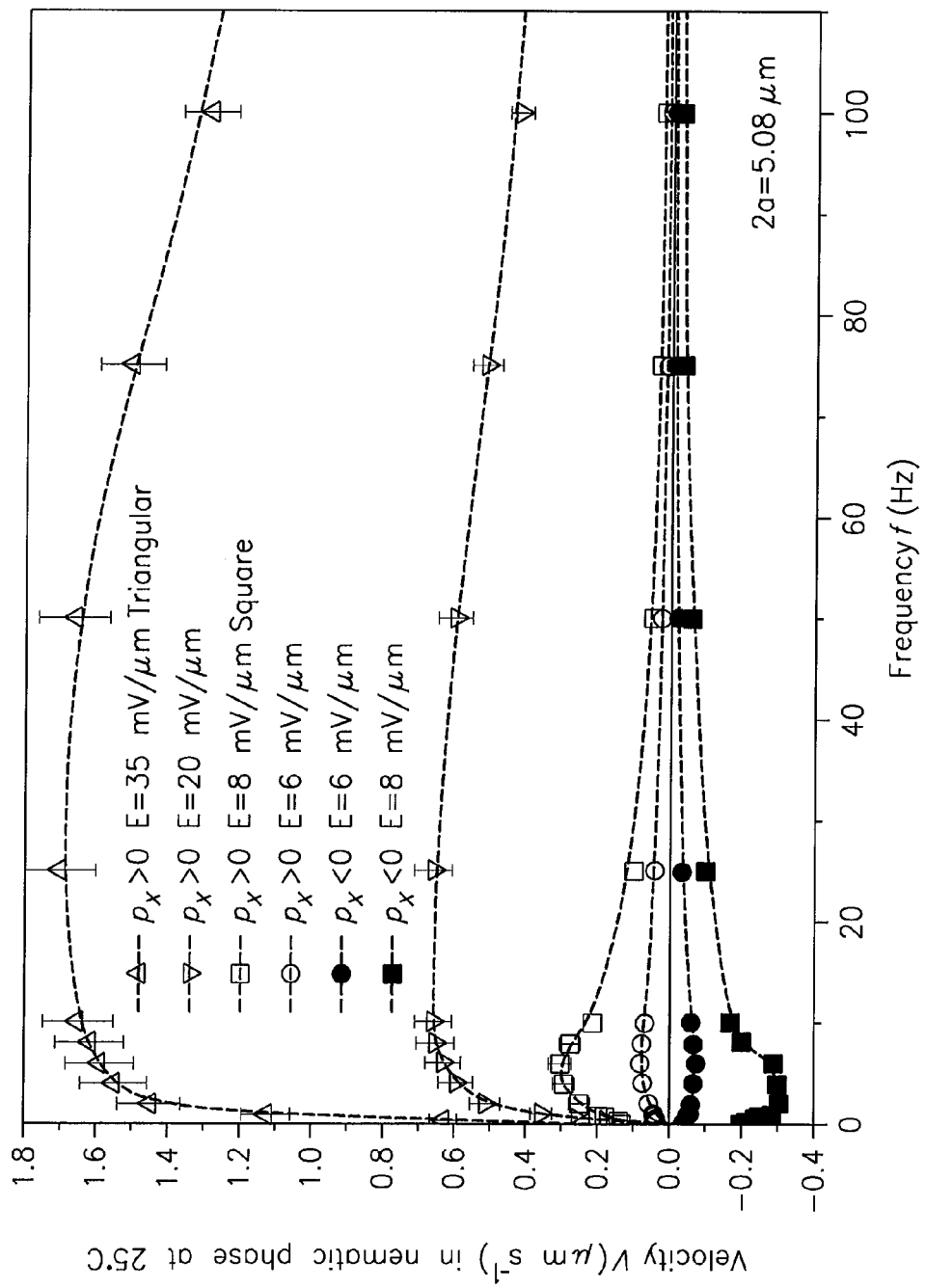
FIG. 2A is a graph showing the velocity vs. frequency of spherical OTS-coated silica particles of diameter 2a=5.08 μm for triangular and square pulse AC fields in E7 liquid crystal (solid symbols correspond to $p_x<0$ and open symbols correspond to $p_x>0$) in accordance with the concepts of the present invention.
Figure 2B:
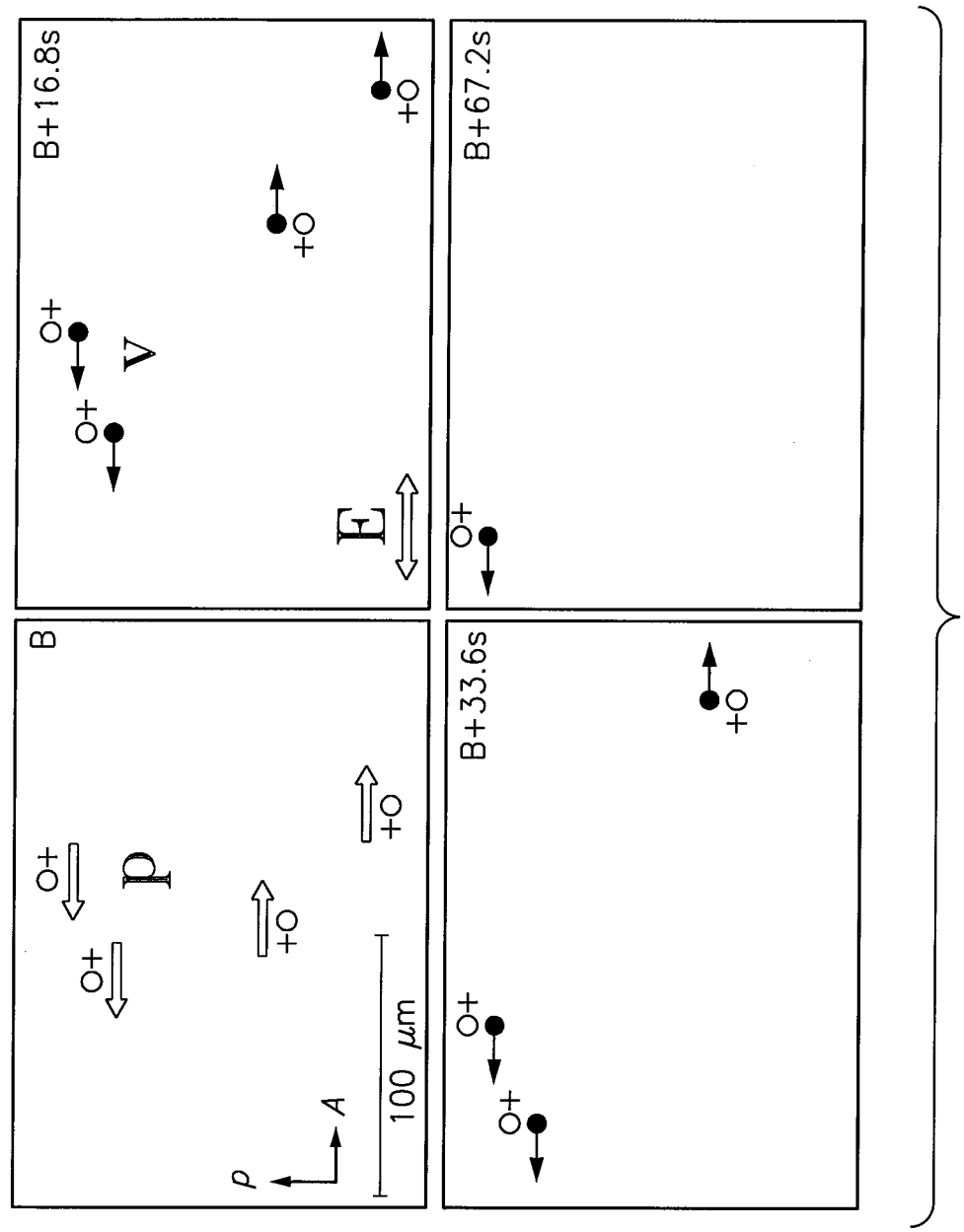
FIG. 2B is a schematic representation of a plurality of polarizing microscope images that show the movement of the OTS-coated silica particles of diameter 2a=5.08 μm (circles represent the spheres and crosses represent the location of the hyperbolic hedgehog) at the following times: 0 s, 16.8 s; 33.6 s; and 67.2 s after the triangular AC field of 45 mV/μm, 100 Hz is applied in accordance with the concepts of the present invention.

The quadratic term in Eq. (2) above indicates that the electrophoresis in the liquid crystal can be driven by an AC electric field, even if this field is symmetric and has a zero time average, as observed in FIG. 2. The linear term in Eq. (2) averages to zero. FIG. 2A shows the frequency dependencies of v for dielectric spheres in the E7 liquid crystal driven by AC fields of different profiles and amplitudes. The AC field drives the particles along $\hat{n}_0$, parallel to p, with the sphere leading the way, as shown in FIGS. 2A-B.

Equation (2) is written for the case when the vectors v, p, and E are all parallel (or anti-parallel) to the x-axis, as shown in FIG. 1D. Generally, the dependence v(E) for nonlinear electrophoresis in a liquid crystal involves tensorial coefficients that depend on p, so that the components of the velocity $v_i$ and the field $E_j$ (i, j=x, y, z) are related as $$v_i = \mu_{ij} E_j + \beta_{ijk} E_j E_k. \quad (3)$$

Figure 3:
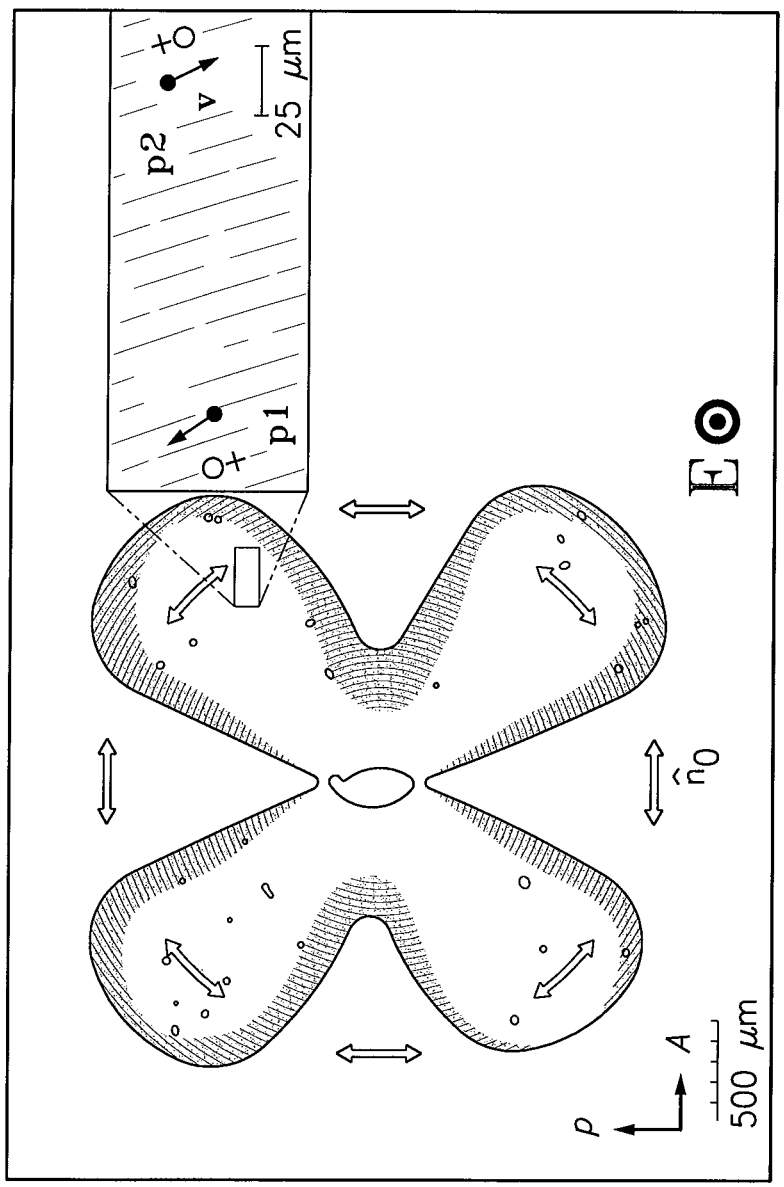
FIG. 3 is a schematic representation of a polarizing microscope image that shows electrophoretic motion of DDMAC-coated borosilicate spheres having a diameter of 2a=9.6 μm moving in the nematic liquid crystal MLC7026-000 in the plane perpendicular to the electric field, along the "racetrack" trajectories set by a non-uniform director $\hat{n}_0$, with the schematic inset image showing enlarged images of two particles moving in opposite directions (circles represent the spheres and crosses represent the location of the hyperbolic hedgehog) in accordance with the concepts of the present invention.

The tensor character of v(E) is manifested by the fact that $\beta$ (but not $\mu$) changes sign with p, so that the velocity components originating in the linear ($\mu_{xx} E_x$) and quadratic ($\beta_{xxx} E_x^2$) parts of Eq. (3) can be not only parallel, but also anti-parallel to each other, as shown in FIGS. 1A-B and FIGS. 2A-B and 2D. Another illustration comes from the experiments with the liquid crystal MLC7026-000 (Merck) in which $\Delta\in = \in_\| - \in_\perp = 3.7$. The negative $\Delta\in$ allowed the application of the field $E=(0,0,E_z)$ perpendicularly to $p=(p_x, p_y, 0)$ without distorting the liquid crystal far away from the particles. By buffing the polyimide aligning layer in a circular fashion, a cell was prepared in which $\hat{n}_0(x, y)$ was non-uniform, and which formed a race-track configuration, as shown in FIG. 3. The electric field was applied by using transparent indium tin oxide electrodes that confined the cell from the top and the bottom. The spheres moved in the (x, y) plane of the cell, perpendicular to E, following the curvilinear trajectories of the racetrack, either counterclockwise or clockwise, depending on the polarity of p, as shown in FIG. 3. The typical velocity is 1 μm/s in the field E=100 mV/μm of frequency 1 Hz. This experiment demonstrates that the liquid crystal-based electrophoresis offers a high degree of flexibility in the control of particle motion. The latter can be further expanded if one uses both DC and AC electric fields, since the AC field contributes only to the second term in Eq. 3.

Figure 2C:
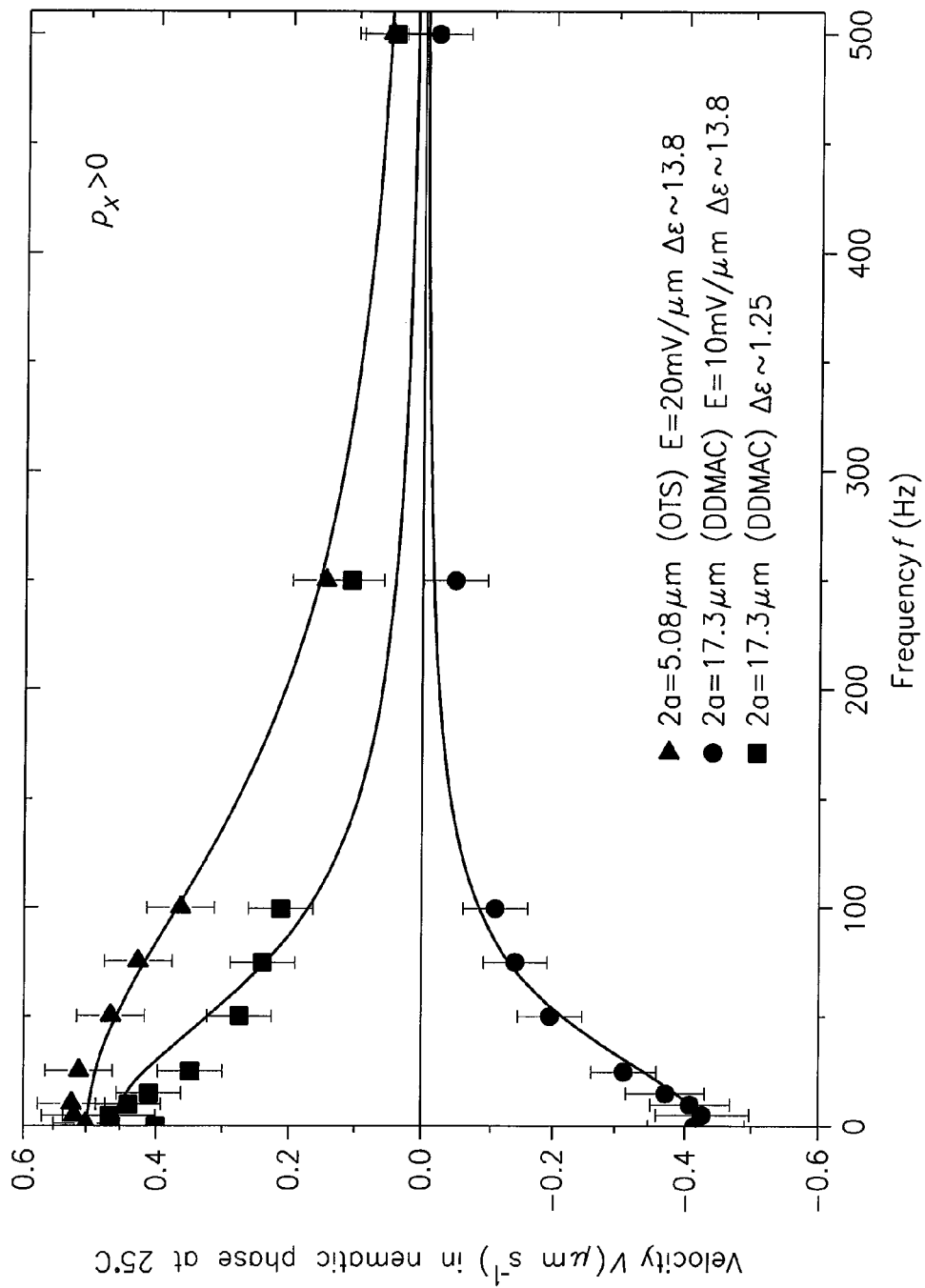
FIG. 2C is a graph showing the velocity vs. frequency of spherical DDMAC-treated borosilicate particles (diameter of 2a=17.3 μm) in a field 10 mV/μm moving in E7 (squares), moving in a mixture with 18.7 wt % of E7 with MLC7026-000 (circles) and OTS-treated silica particles (a diameter of 2a=5.08 μm) in a field 20 mV/μm moving in E7 (triangles), (solid curves represent the fit with Eq. 3) in accordance with the concepts of the present invention.
Figure 2D:
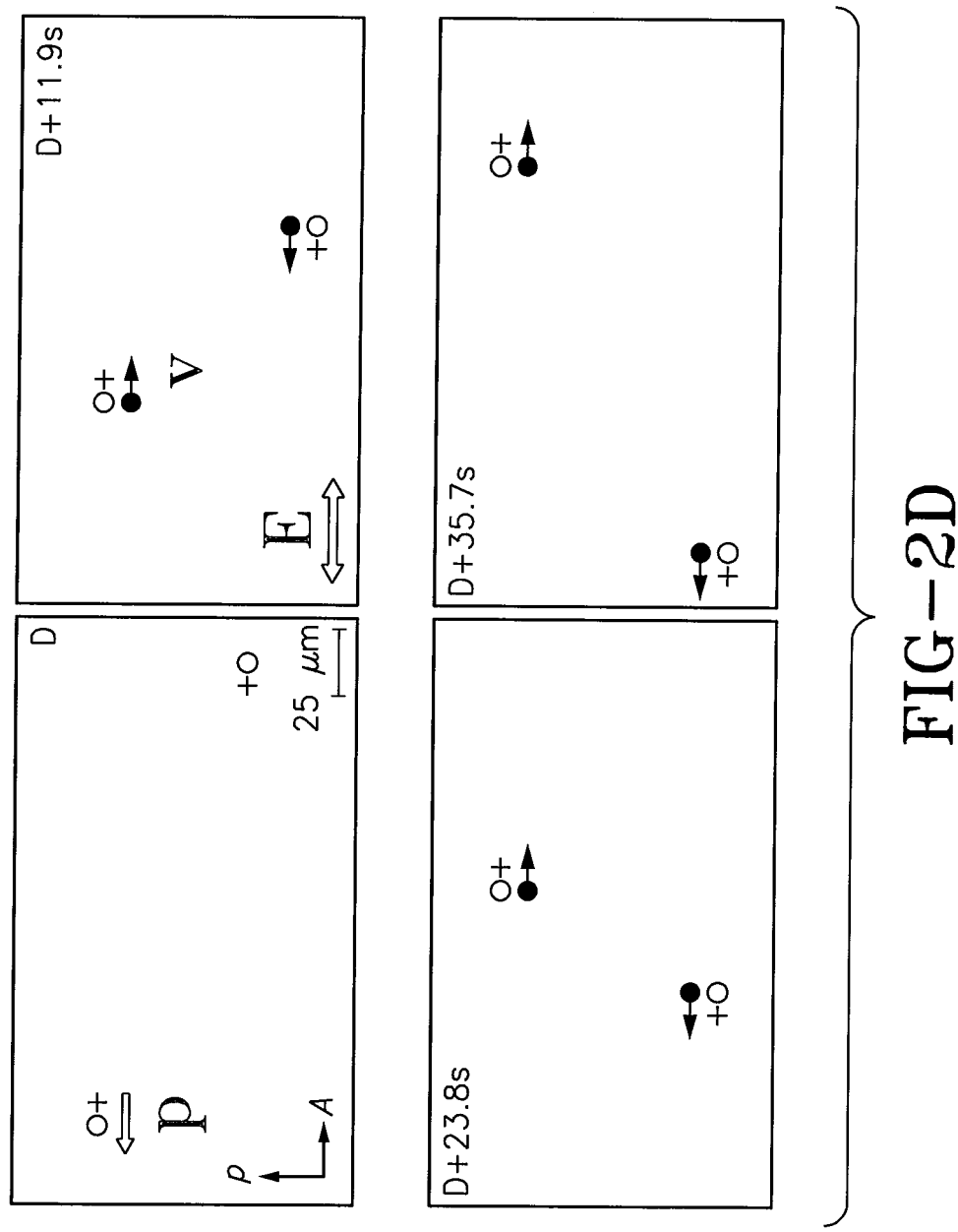
FIG. 2D is a schematic representation of a plurality of polarizing microscope images that show the movement of the DDMAC-treated particles having a diameter of 2a=17.3 μm (circles represent the spheres and crosses represent the location of the hyperbolic hedgehog) in a mixture with 13.5 wt % of E7 with MLC7026-000 at the following times: 0 s, 11.9 s, 23.8 s and 35.7 s, after a 30 mV/μm, 1 Hz electric field is applied in accordance with the concepts of the present invention.

In a separate experiment, the role of dielectric anisotropy $\Delta\in$ was verified. In the E7 liquid crystal, $\Delta\in=13.8$ is large, causing a dielectric torque $\propto \Delta\in$ on the director near the spheres. To minimize this torque, E7 liquid crystal was mixed with MLC7026-000, whereupon $\Delta\in$ reduces to 1.25 at the concentration 18.7 wt % of E7 and practically vanishes to $\Delta\in=0.03$ at 13.45 wt % (measured for 25° C. and 1 kHz). The electrophoresis in these two mixtures was similar to the case of E7 liquid crystal, as shown in FIG. 2C, demonstrating that the dielectric reorientation of the director is not the prevailing driving mechanism.

Figure 4:
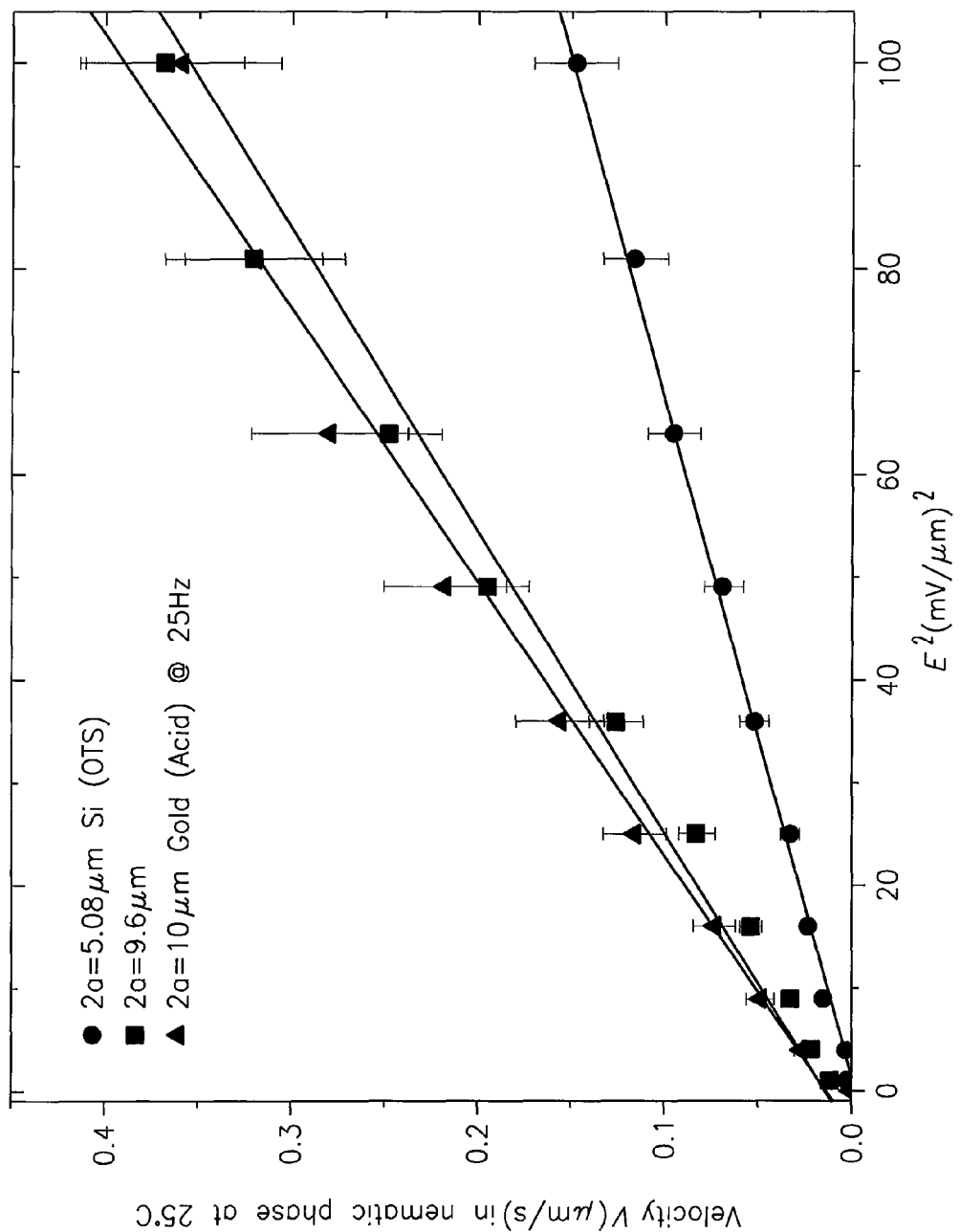
FIG. 4 is a graph showing electrophoretic velocity v vs. $E^2$ (sinusoidal field of 25 Hz, $p_x>0$) for OTS-coated silica spheres with a diameter of 2a=5.08 μM (circles); OTS-coated borosilicate spheres having a diameter of 2a=9.6 μm (squares); and gold spheres having a diameter of 2a=10 μm (triangles), moving in E7 in accordance with the concepts of the present invention.

The nonlinear character of AC propulsion is especially clear when v is plotted vs. $E^2$ (for a fixed frequency of a sinusoidal profile), as shown in FIG. 4. Fitting of the data with Eq. (2) yields the values of the same order of magnitude as in the DC case: $\beta_{Si}^N = 1.5 \times 10^{-3}/\text{m}^3/\text{mV}^2\cdot\text{s}$ for silica particles of diameter 2a=5.08 μm, $\beta_{BSi}^N = 3.4 \times 10^{-3}$ μm$^3$/mV$^2$·s for borosilicate particles of diameter 2a=9.6 μm, and $\beta_{Au}^N = 3.8 \times 10^{-3}$ μm$^3$/mV$^2$·s for gold particles of diameter 2a=10 μm.

The AC and nonlinear DC electrophoretic effects are observed for spherical particles when the director distortions around them are of a dipolar type, as shown in FIG. 1D. If the director distortions preserve the fore-aft symmetry, as is the case of the equatorial defect ring, shown in (A) of FIG. 5, these effects vanish. To produce the defect structure with an equatorial ring, the recipe of Gu and Abbott was followed, namely, by using shallow cells with the separation between the plates that is close to the diameter of particles. The AC field caused back-and-forth linear electrophoresis of the particles, but no net propulsion.

Discussion

Figure 5:
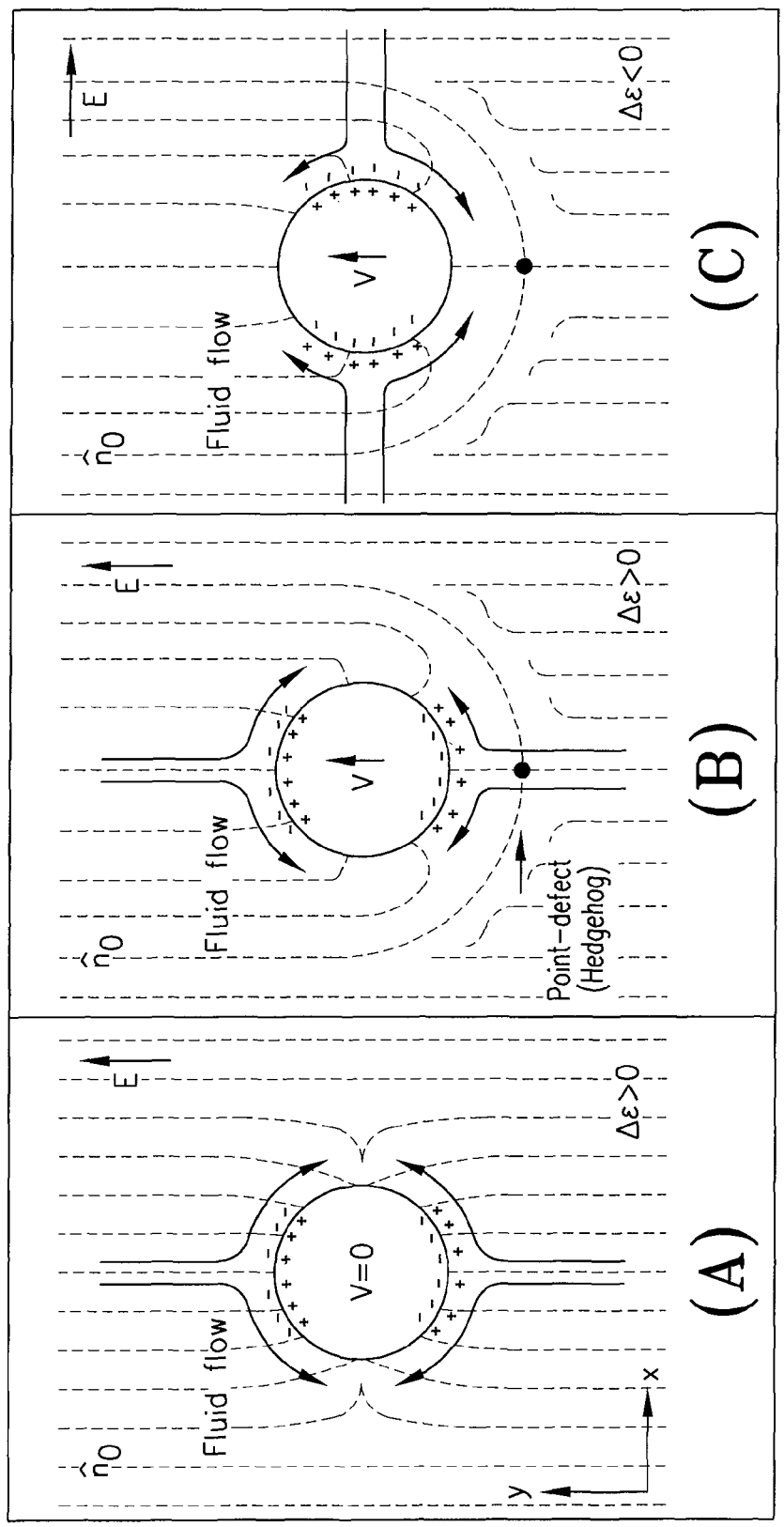
FIG. 5 is a schematic representation of spherical particles with normal anchoring at the surface that are embedded in a uniformly-aligned nematic LC with quadrupolar symmetry (A) and dipolar symmetry (B) with an electric field applied along the director $\hat{n}_0$, and dipolar symmetry (C) with an electric field applied perpendicular to the director $\hat{n}_0$, (director distortions shown by dotted lines), whereby the Saturn ring configuration shown in (A) preserves the fore-aft symmetry, resulting in zero electrophoretic mobility, while the hyperbolic hedgehog configuration shown in (B) breaks the fore-aft symmetry, and (C) breaks the left-right symmetry and are responsible for the nonlinear electrophoresis in accordance with the concepts of the present invention.

Thus, it should be appreciated that the mechanisms of the AC and non-linear DC electrophoresis in a liquid crystal medium are rooted in the type of LC director distortions, which violate the fore-aft (or left-right) symmetry of the liquid crystal. In contrast, for electrokinetic phenomena in isotropic fluids, the broken symmetry of the particles themselves can lead to a non-linear DC and AC electrophoresis with $v \propto E^2$. Induced-charge electrophoresis (ICEP) was experimentally demonstrated for anisotropic quartz particles and for Janus spherical particles (comprised of two semispheres with different properties) in an isotropic fluid. However, the critical difference in liquid crystal electrophoresis is that particle motion is caused by the broken symmetry of the medium, rather than by the particle itself, as shown in FIG. 5. That is, the difference in operation of the present invention is that in an isotropic fluid, the particle must be asymmetric for AC effect to take place. In the present invention, the use of an anisotropic medium, such as a liquid crystal, allows a particle, such as an ideal sphere to be propelled, as the needed symmetry breaking is provided by the carrier anisotropic medium itself.

Consider an uncharged metallic (gold) particle in a liquid crystal. Once the electric field is switched on, the mobile ions of the liquid crystal start to move in two opposite directions. These ions cannot penetrate the surface of a particle, and thus accumulate at its opposite sides. The field-induced ionic clouds attract the "image charges" from within the conducting sphere, thus producing a field-induced Debye screening layer. The field-induced non-uniform zeta potential can be estimated as $\zeta_{ind} \sim aE$. In the steady state, the tangential component of E drives the mobile ions, and thus the fluid, from the poles of the sphere towards its equator. The directionality of this ICEP flow does not change with the field reversal, as shown in FIG. 5. If the particle and the surrounding medium have mirror-image symmetry, the slip velocity produces no electrophoretic propulsion, as illustrated in FIG. 5A for a sphere with an equatorial defect ring. The hedgehog configuration, shown in FIG. 5B-C, breaks this symmetry, such that the flows on the opposite sides of the sphere are not symmetric and give rise to an electrophoretic velocity $\sim v \sim (aE)E \sim aE^2$, where one power of E sets up the induced charge clouds and the second power drives the resultant flow.

This qualitative picture suggests that in Eq. (2), $\beta = \delta \in_m a/\eta$ for metallic particles, where $\delta$ is the dimensionless factor characterizing the medium asymmetry; $\delta=0$ in FIG. 5A and $\delta \neq 0$ in FIGS. 5B-C. If the particle is dielectric, the characteristic length should be $\lambda_D$ instead of a, so that $\beta = \delta \in_d \lambda_D/\eta$, where $\in_d$ is the permittivity of the particle. For gold spheres with a diameter of 2a=10 μm, estimating, $\eta=0.1$ Pa·s, and average permittivity $\in_m=10\in_0$ for E7, and assuming $\delta=1$, one finds $\beta = 5 \times 10^{-3}$ μm$^3$/mV$^2$·s close to $\beta_{Au}^N = 4 \times 10^{-3}$ μm$^3$/mV$^2$·s measured in the AC field. For dielectric spheres, one finds $\beta = 0.5 \times 10^{-3}$ μm$^3$/mV$^2$·s using $\in_d = 5.8\in_0$, $\lambda_D = 1$ μm and $\delta=1$ of the same order as the experimental values.

For metallic particles, the director field asymmetry is the only mechanism of electrophoretic propulsion $v=\beta E^2$, since the permanent zeta potential $\zeta$ is zero, as shown in FIG. 1C. For dielectric spheres, the electrophoretic velocity is determined by both the linear and quadratic terms $v = \mu E + \beta E^2$, as shown in FIGS. 1A-B. In the AC field, the linear term averages out and $v \propto E^2$ for both the metallic and dielectric particles, as shown in FIG. 4.

The following discussion presents how v depends on the frequency of the sinusoidal AC field, as shown in FIG. 2, following the considerations for isotropic fluids. The ICEP velocity is controlled by two time scales; 1) a characteristic charging time $\tau_c = \lambda_D a/D$ (for a conductive sphere) and $\tau_e = \epsilon_m \lambda_D^2 / \epsilon_d D$ (for a dielectric sphere); and 2) the characteristic electrode charging time $\tau_e = \lambda_D L/2D$. In the order of magnitude, $\tau_c = 10^{-2}$ s and $\tau_e = 10^2$ s, with $\lambda_D = 1$ µm and $D = 10^{-11}$ m$^2$/s.

For moderate fields and thin counterionic clouds, $\lambda_D \ll a \ll L$, the bulk AC field is controlled by $\tau_e$:

$$\tau_e : E_o(t) = \frac{V_o}{L} \cos(\omega t) \text{Re}\left[\frac{i\omega\tau_e}{1 + i\omega\tau_e} e^{-i\omega t}\right],$$

and the time dependent polarization of the sphere is proportional to $$\text{Re}\left(\frac{e^{i\omega t}}{1 + \omega\tau_c}\right).$$

Combining these two results, one obtains the frequency dependence of the electrophoretic velocity:

$$v(\omega) = v_o \frac{\omega^2 \tau_e^2}{(1 + \omega^2 \tau_c^2)(1 + \omega^2 \tau_e^2)}. \quad (4)$$

Equation (4) describes the experimental dependencies v(f), where f=ω/2π, as shown in FIG. 2C. The velocity increases as $\omega^2$ when w is low, but at the high ω, v decreases since the ions cannot follow the rapidly changing field. All three experimental dependencies in FIG. 2C were fitted with practically the same values of parameters in Eq. 4, namely $\tau_c$ in the range (0.005-0.015) s, $\tau_e$ in the range (43-53) s and L=10 mm.

SUMMARY

Thus, electrophoretic motion, including highly-nonlinear motion, of particles in an orientationally-ordered nematic liquid crystal has been demonstrated. The particles can be driven either by a DC or AC electric field, regardless of whether their zeta potential is finite (dielectric spheres) or zero (metallic spheres). The liquid crystal electrophoresis is much richer than its isotropic counterparts, as it adds new degrees of freedom in particle manipulation. In an isotropic fluid, the electrophoretic particle must be electrically charged (have a nonzero permanent zeta potential) or be asymmetric in shape or in surface properties. Neither of these requirements needs to be satisfied in the liquid crystal case, as the particle can be of any shape, including a highly-symmetric sphere, and can be of any charge state. Thus, the liquid crystal as an electrophoretic medium provides additional degrees of freedom in the electrically-controlled manipulation of particles. The components of velocity that originate in the linear and quadratic terms of Eqs. (2) and (3) need not be parallel to each other, and the particles can be moved in any direction in 3-D space. The described phenomenon of liquid crystal electrophoresis offers new perspectives for practical applications where a highly-flexible, precise, and simple control of particle (or cargo) placement, delivery, mixing, or sorting is needed. Examples include microfluidic devices, electrophoretic displays and their hybrids with the conventional liquid crystal displays (LCDs) that have been already explored for the case of linear electrophoresis. The practical potential of liquid crystal-based electrophoresis is further expanded by the fact that the trajectories and velocities of particles can be controlled not only by the frequency dependent linear and quadratic mobilities in Eqs. (2) and (3), but also by the spatially-varying director field $\hat{n}_0$ (r) that can be used as a curvilinear "rail" to transport the particles, as shown in FIG. 3.

In addition, while the described mechanism of liquid crystal based electrophoresis is based on the use of thermotropic liquid crystals as the carrier medium, other liquid crystal types may also be used, such as solvent-based lyotropic liquid crystals, and the like. Lyotropic liquid crystals, such as chromonics, are compatible with materials of biological origin, thus allowing nonlinear electrophoresis to be used to separate molecules of biological origin, such as DNA, proteins, and particles such as vesicles, bacteria, and viruses, which is highly desirable. Biological molecules can also be transported in thermotropic liquid crystals, either in an encapsulated form, or in their native form, especially if they are hydrophobic.

The use of liquid crystals as an electrophoretic medium, as contemplated by the present invention, thus provides the unique ability to transfer particles in any type of AC or DC electric field and to do so for particles of arbitrary shape (including spheres), and arbitrary electric charge (even when this charge is zero). It has been demonstrated that electrically-neutral gold particles of vanishingly small charge still move in an AC field, as it is the ionic nature of the nematic fluid that supplies the charges. Furthermore, a high electric field is not required to cause the nonlinearity, as it is rooted in the symmetry of the medium; therefore, the nematic LC carrier can be used in electrophoretic transport of very soft objects or particles in a low electric field. The effect is of importance for fundamental understanding of electrokinetic phenomena in complex fluids and provides an approach to colloidal assembly, separation, microfluidic and micromotor applications, as well.

Therefore, one advantage of the present invention is that due to the quadratic or non-linear dependence $v \sim E^2$, electrophoretic motion in a liquid crystal as contemplated by the present invention occurs naturally under an action of an alternating current (AC) electric field, with a zero time average, which is in contrast to the linear electrophoresis that is observed in regular isotropic fluids, where the highly desirable AC field transport is impossible because of the linear dependence $v \sim E$, whereupon the AC field shifts the particles back and forth with no net propulsion. Another advantage of the present invention is that the electrophoretic effect in the liquid crystal allows one to transport both charged and neutral particles, even when the particles themselves are perfectly symmetric (spherical), thus enabling new approaches in colloidal assembly, separation, microfluidic and micromotor applications. Yet another advantage of the AC-driven electrophoresis of the present invention is that it can be used in separation of proteins, DNA molecules, viruses and microbes, vesicles and various other biological entities. Another advantage of the present invention is that one can create steady particle flows/motions, while avoiding both "memory effects" associated with irreversible absorption of ions and chemical reactions caused by DC field near the electrodes, which is important in prolonging the operating life of electrophoretic e-ink and e-paper displays. Still another advantage of the present invention is that 3-D control of particle trajectories (through the control of linear and quadratic components of velocity) is enabled, allowing for sorting and display applications, as it can allow one to move the particles of different types in different directions.

Although the present invention has been described in considerable detail with reference to certain embodiments, other embodiments are possible. Therefore, the spirit and scope of the appended claims should not be limited to the description of the embodiments contained herein.

What is claimed is:

1. A method of non-linear electrophoretic movement of a particle comprising:
   providing a nematic liquid crystal between a pair of plates, said nematic liquid crystal having a director field in which the orientation of said director field proximate to said plates has a first alignment orientation;
   disposing a particle having a surface in said nematic liquid crystal, such that the orientation of said director field proximate to said surface of said particle has a second alignment orientation that is different from said first alignment orientation, whereby distortions in said director field are formed around at least part of said surface of said particle;
   subjecting said liquid crystal to an AC (alternating current) electric field, such that said distortions around said particle cause the velocity of mobile ions in said liquid crystal moving between said plates to be asymmetric;
   guiding said particle along a three-dimensional path defined by an alignment layer disposed on one of said plates; and
   moving said particle along said three-dimensional path through said nematic liquid crystal.

2. The method of claim 1, wherein said plates are at least partially transparent.

3. The method of claim 1, wherein said first alignment orientation of said director field is substantially parallel to said plates.

4. The method of claim 1, wherein said nematic liquid crystal is a thermotropic liquid crystal.

5. The method of claim 1, wherein said nematic liquid crystal is a lyotropic liquid crystal.

6. The method of claim 1, wherein said nematic liquid crystal has a positive, negative or zero dielectric anisotropy.

7. The method of claim 1, wherein said particle comprises an OTS-coated sphere.

8. The method of claim 1, wherein said particle comprises a DDMAC-coated sphere.

9. The method of claim 1, wherein said particle is a metallic sphere.

10. The method of claim 1, wherein said particle is a dielectric sphere.

11. The method of claim 1, wherein said particle is asymmetric in shape.

12. The method of claim 1, wherein said particle is conductive.

13. The method of claim 1, wherein said particle is formed of polymeric material.

14. The method of claim 1, wherein said particle is a carbon nanotube.

15. The method of claim 1, wherein said particle is a biologic particle selected from the group consisting of proteins, DNA molecules, viruses, microbes, and vesicles.

16. The method of claim 1, wherein said second alignment orientation of said director field is substantially perpendicular with respect to said surface of said particle.

17. The method of claim 1, wherein said second orientation of said director field is tilted at an angle with respect to said surface of said particle.

18. A method of non-linear electrophoretic movement of a particle comprising:
   providing a pair of plates;
   disposing a polyimide layer on one of said plates;
   buffing said polyimide layer to define a three-dimensional path;
   disposing a nematic liquid crystal between said plates, said nematic liquid crystal having a director field, such that the orientation of said director field proximate to said polyimide layer has a first alignment orientation;
   disposing a particle having a surface in said nematic liquid crystal, such that the orientation of said director field proximate to said surface of said particle has a second alignment orientation that is different from said first alignment orientation, whereby distortions in said director field are formed around at least part of said surface of said particle;
   subjecting said liquid crystal to an AC (alternating current) electric field, such that said distortions around said particle cause the velocity of mobile ions in said liquid crystal moving between said plates to be asymmetric; and
   moving said particle through said nematic liquid crystal along said three-dimensional path.

19. The method of claim 18, wherein said plates are at least partially transparent.

20. The method of claim 18, wherein said first alignment orientation of said director field is substantially parallel to said plates.

21. The method of claim 18, wherein said nematic liquid crystal is a thermotropic liquid crystal.

22. The method of claim 18, wherein said nematic liquid crystal is a lyotropic liquid crystal.

23. The method of claim 18, wherein said nematic liquid crystal has a positive, negative or zero dielectric anisotropy.

24. The method of claim 18, wherein said particle comprises an OTS-coated sphere.

25. The method of claim 18, wherein said particle comprises a DDMAC-coated sphere.

26. The method of claim 18, wherein said particle is a metallic sphere.

27. The method of claim 18, wherein said particle is a dielectric sphere.

28. The method of claim 18, wherein said particle is asymmetric in shape.

29. The method of claim 18, wherein said particle is conductive.

30. The method of claim 18, wherein said particle is formed of polymeric material.

31. The method of claim 18, wherein said particle is a carbon nanotube.

32. The method of claim 18, wherein said particle is a biologic particle selected from the group consisting of proteins, DNA molecules, viruses, microbes, and vesicles.

33. The method of claim 18, wherein said second alignment orientation of said director field is substantially perpendicular with respect to said surface of said particle.

34. The method of claim 18, wherein said second orientation of said director field is tilted at an angle with respect to said surface of said particle.

35. A liquid crystal cell for non-linear electrophoresis comprising:
   a pair of plates adapted to be coupled to a power source;
   an alignment layer disposed on one of said plates to define a three-dimensional path;
   a liquid crystal material disposed between said plates, said liquid crystal material having a director field in which the orientation of said director field proximate to said plates has a first alignment orientation; and a particle disposed within said liquid crystal material, said particle having a surface in which the orientation of said director field proximate to said surface of said particle has a second alignment orientation that is different from said first alignment orientation, such that distortions in said director field are formed around at least part of said surface of said particle;

wherein when an AC (alternating current) electric field is applied to said plates by said power source, said distortions cause the velocity of mobile ions in said liquid crystal material moving between said plates to be asymmetric, causing said particle to move along said three-dimensional path.

36. The liquid crystal cell of claim 35, wherein said plates are at least partially transparent.

37. The liquid crystal cell of claim 35, wherein said first alignment orientation of said director field is substantially parallel to said plates.

38. The liquid crystal cell of claim 35, wherein said nematic liquid crystal is a thermotropic liquid crystal.

39. The liquid crystal cell of claim 35, wherein said nematic liquid crystal is a lyotropic liquid crystal.

40. The liquid crystal cell of claim 35, wherein said nematic liquid crystal has a positive, negative or zero dielectric anisotropy.

41. The liquid crystal cell of claim 35, wherein said particle comprises an OTS-coated sphere.

42. The liquid crystal cell of claim 35, wherein said particle comprises a DDMAC-coated sphere.

43. The liquid crystal cell of claim 35, wherein said particle is a metallic sphere.

44. The liquid crystal cell of claim 35, wherein said particle is a dielectric sphere.

45. The liquid crystal cell of claim 35, wherein said particle is asymmetric in shape.

46. The liquid crystal cell of claim 35, wherein said particle is conductive.

47. The liquid crystal cell of claim 35, wherein said particle is formed of polymeric material.

48. The liquid crystal cell of claim 35, wherein said particle is a carbon nanotube.

49. The liquid crystal cell of claim 35, wherein said particle is a biologic particle selected from the group consisting of proteins, DNA molecules, viruses, microbes, and vesicles.

50. The liquid crystal cell of claim 35, wherein said second alignment orientation of said director field is substantially perpendicular with respect to said surface of said particle.

51. The liquid crystal cell of claim 35, wherein said second orientation of said director field is tilted at an angle with respect to said surface of said particle.

* * * * *